Dec. 28, 1954     O. E. ANDRUS     2,698,291
CATHODICALLY PROTECTED DOMESTIC
WATER STORAGE TANK AND HEATER
Filed June 4, 1951
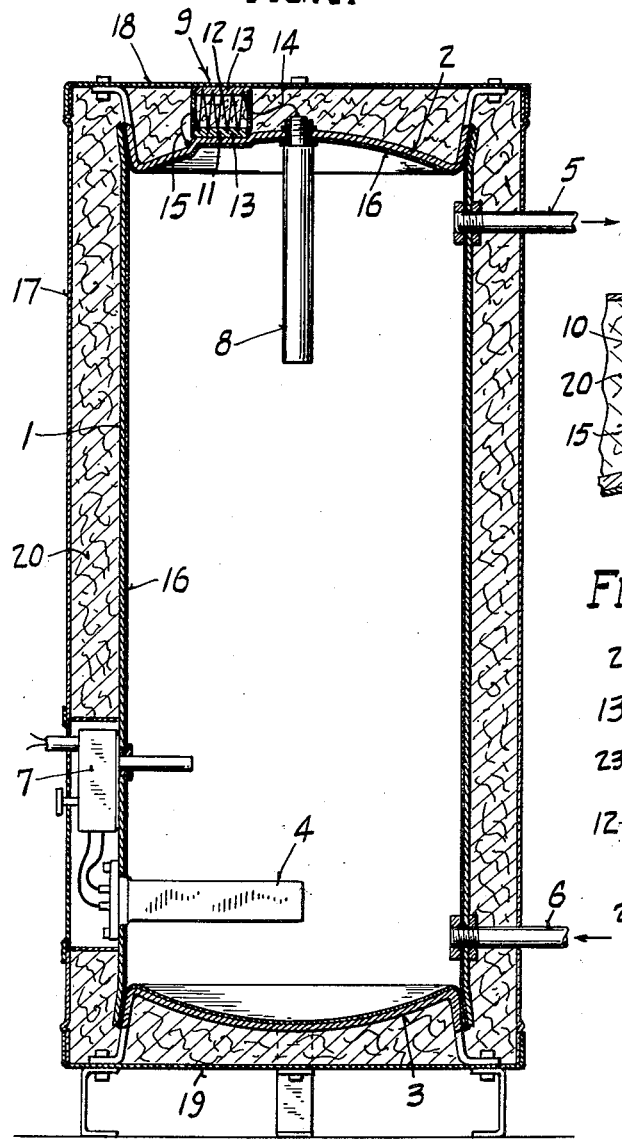
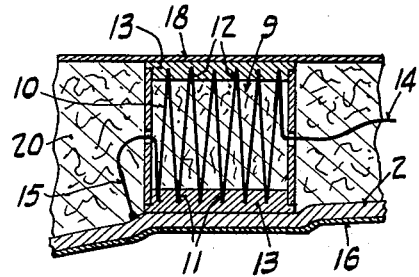
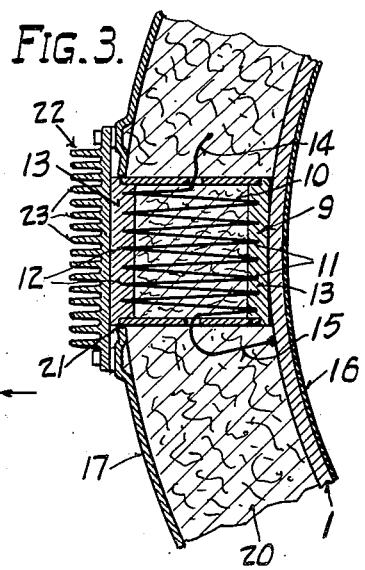
INVENTOR.
Orrin E. Andrus.
BY
ATTORNEYS.

United States Patent Office 2,698,291
Patented Dec. 28, 1954

2,698,291

CATHODICALLY PROTECTED DOMESTIC WATER STORAGE TANK AND HEATER

Orrin E. Andrus, Milwaukee, Wis., assignor to A. O. Smith Corporation, Milwaukee, Wis., a corporation of New York Application June 4, 1951, Serial No. 229,736

2 Claims. (Cl. 204—196)

This invention relates to domestic water storage tanks and heaters and particularly to the cathodic protection of the tank shell by thermo-battery means. This application is a continuation in part of the inventor's application filed June 12, 1948, Serial No. 32,589, for Cathodically Protected Lined Metal Structures (now abandoned).

The operation of the thermo-battery is provided for by the heat of the stored water within the tank shell as a constant and uniform heat source and the exposed protective metal casing or another part thereof for heat removal. Insulation means between the shell and casing to retain the heat of the stored water maintains the temperature differential of the adjacent portions of the shell and casing to ensure operation of the thermo-battery means within operating and dimensional limits of the conventional domestic water storage heater.

An object of the invention is to provide for the dependable operation of the thermo-battery throughout the period of service of the water storage heater and without interruptions or intermittance.

A further more particular object is to provide a relatively constant voltage to allow the use of an anode made of an electrical conductor which is less chemically active within hot water than the metal of the shell and to eliminate the danger of reversal of current and the resultant rapid galvanic attack of the shell which otherwise can occur with an undependable electrical generator which allows appreciable variation in the generated voltage.

Another object is to provide continuously adequate or complete cathodic protection of the shell by thermo-battery means in conjunction with an electrically resistant lining adapted to reduce the current requirements of the thermo-battery.

A more particular object is to provide continuously dependable and uniform heating and cooling of the corresponding junctions of the thermo-battery to thereby maintain the voltage output of the thermo-battery above the predetermined minimum limit required to prevent contamination of the water by corrosion products originating from the shell and to prevent penetration of the shell by corrosion, and below the predetermined maximum limit required to prevent damage to the protective lining of the shell and to minimize the contamination of the water by electro-chemical reactions involving the elements of the anode.

These and other objects and advantages will be more fully set forth in the following description of a preferred embodiment of the invention as illustrated in the accompanying drawing.

In the drawing:

Figure 1 is a vertical transverse section through a water heater;

Fig. 2 is a detailed cross-section taken through the installed thermo-battery showing the construction thereof and of a part of the hot water storage tank; and Fig. 3 is a horizontal detail section showing an alternate embodiment of the invention.

The domestic water storage heater shown in the drawing comprises the metal cylindrical shell 1 which includes the upper and lower closure members 2 and 3, and the element 4 for heating the water received and contained within shell 1. The pipes 5 and 6 are connected to shell 1 at the upper and lower ends respectively, and respectively provide for the withdrawal of heater water from the upper end of the shell under the pressure of the unheated water supplied to the lower end of the shell.

Element 4 for heating the water is controlled by the regulator 7 which is disposed so as to be responsive to the temperature of the water within the shell. Regulator 7 is operatively connected to element 4 to control the latter and is adapted to be adjusted to provide for heating and maintaining the water within shell 1 within the desired temperature range.

Element 4 may comprise an electric resistance heating unit as shown in the drawing, or may comprise other heating means such as a gas burner, not shown. Regulator 7 is located with respect to the upper and lower ends of the shell so that a given volume of heated water at a predetermined minimum temperature is maintained in the upper part of the shell above the regulator and is maintained available for withdrawal and use at all times within the capacity of the shell.

The cathodic protection of shell 1 is provided by the electrode 8 disposed therein and exposed to the water contained in the shell, and by the thermo-battery 9 electrically connected to shell 1 and the element 8.

The thermo-battery 9 comprises a series of thermocouples 10 of electrically insulated material having hot and cold junctions 11 and 12 respectively, which are embedded in a material 13 providing efficient heat transfer as necessary for the operation of the thermopile and which may be insulated electrically from each other.

The wire 14 connects the positive terminal of thermo-battery 9 and electrode 8 and wire 15 connects the negative terminal of the thermo-battery and shell 1 whereby electrode 8 and shell 1 are maintained, respectively, anodic and cathodic by the operation of the heating element 4.

Electrode 8 comprising the anode is electrically insulated from shell 1 and is preferably made of an electrically conductive material which is less corrodible than is steel in hot water to thereby eliminate the anode as a factor in the longevity of service of the water heater and to avoid the necessity of periodic inspections and replacements of the element.

In accordance with the disclosure of the present inventor's Patent No. 2,267,361, the ceramic coating 16 applied to the interior of shell 1 is employed to reduce the area of exposure of the shell to corrosion and to reduce the current necessary for the cathodic protection of the structure.

The protective metal casing 17 which includes the upper and lower end members 18 and 19 is provided with suitable apertures for pipes 5 and 6, element 4 and regulator 7, and otherwise surrounds shell 1.

The operation of thermo-battery 9 is effected and maintained by the heat from the water maintained in storage in shell 1 and the heat transfer to the atmosphere afforded by the outer protective metal casing 17. Accordingly, thermo-battery 9 is located near the upper end of shell 1 and above regulator 7 so that the hot junctions 11 are adjacent the hot water which remains in supply at the top of the shell essentially at all times.

In the embodiment shown in Figs. 1 and 2 of the drawing, thermo-battery 9 is disposed between shell 1 and casing 17 with junctions 11 proximate to closure member 2 of the shell and junction 12 proximate to the upper end member 18 of the casing. Each series of junctions 11 and 12 is embedded in material 13, of suitable heat conductance which maintains a contact with shell 1 and casing 17, respectively, for the heat transfer from shell 1 to the junctions 11 and from the junctions 12 to casing 17.

Since the dimensions of a thermo-battery for a given electrical potential and resistance are dependent on the hot and cold junction temperature and since the heat transfer lengthwise of a thermo-battery for a given electrical potential and resistance is essentially the same for any length of thermo-battery, it is important to heat insulate the heater shell from the heater casing in the vicinity of the thermo-battery to make it possible to minimize the dimensions and the cost of the thermo-battery. The insulation 20 disposed between shell 1 and casing 17 to retain the heat of the shell and the water contained therein, prevents loss of heat to the casing whereby the casing 17 is maintained close to the temperature of the atmosphere to which the same is exposed and the junctions 12 are maintained at a temperature uniformly lower than that of junctions 11.

The uniformity of the temperature differential of the casing and shell as maintained by regulator 7 and insulation 20 thus provides for the generation of electrical potential within a predetermined constant range and without interruption during the period of service of the heater.

Casing 17, by reason of its area of exposure is readily adapted by modification of thickness or composition to provide for the dependable cooling of junctions 12 of thermo-battery 9.

In the embodiment of the invention shown in Fig. 3, casing 17 is provided with an aperture 21 which may be utilized for the installation of thermo-battery 9 in the side of the heater with junctions 11 adjacent to shell 1 to receive the heat of the stored water therein through the material 13 which contacts the shell. The closure member 22 is secured to casing 17 over aperture 21 to provide for cooling of junctions 12.

Member 22 comprises a single plate preferably of copper or aluminum having optimum heat conduction properties and includes a series of fins 23 vertically disposed and projecting from the side of the heater, so as to be exposed to the sweep of air which generally passes by convection upwardly around the casing. As in the embodiment shown in Figs. 1 and 2, the constant operation of thermo-battery 9 within the electrical potential range desired is provided to maintain the heat differential between shell 1 and member 22 by reason of the insulation 20 surrounding thermo-battery 9 which is effectively disposed between shell 1 and member 22 to minimize the transfer of heat from shell 1 by radiation, convention or conduction to member 22.

In both embodiments of the invention the operation of the thermo-battery for the cathodic protection of the shell is effected with temperatures not exceeding that of the water within the shell, thereby avoiding the deterioration of the thermo-battery in the service normally encountered where a flame or other high temperature heating means is more directly applied to the thermo-battery.

The uniformity of the heat differenial, as maintained by regulator 7 and insulation 20, assures at all times not less than the minimum potential required for full cathodic protection of the shell throughout the period of service of the heater and at all times not more than the potential which must not be exceeded particularly where a corrosion-resistant lining of the shell is employed and where a long-lived anode is desired.

While coating 16 is known to provide the advantages referred to above particularly in reducing the current required and size and cost of the thermo-battery, whenever the voltage and current exceed predetermined values beyond that required for full cathodic protection such coatings are subject to undermining by hydrogen forming thereunder, to electrical osmosis in the case of moisture absorbent coatings, and to chemical attack where the coating is sensitive to alkali. A very long life can be obtained from a carbon anode providing that the current density is maintained sufficiently low by proper control of the maximum output potential of the thermo-battery.

Relatively non-corrodible anodes which are known to provide correspondingly longer service, further reduce or eliminate the problem of metallic contamination of the water. However, such advantages assume the dependability and the uniformity of the source of potential.

In case of interruption or where inadequate generation of voltage is the case, the protective system forms a galvanic cell with the polarity of the electrode 8 and shell 1 reversed. Such reversal effects an electro-chemical reaction destructive to the shell. Where a protective lining is also employed, such reversal of current is particularly destructive to the underlying steel at imperfections within the coating since the destructive galvanic currents attain a high anodic current density. An excessive current density creates the further danger of metallic contamination by setting free in the water, iron compounds originating from the shell exposures through the coating. Depending on the type of water and substances present, such contamination can be objectionable if the water is taken internally and injurious to laundry.

The invention guarantees the full cathodic protection of the shell during those periods of operation of the heater when such protection is required. During periods of non-service corrosion protection within domestic heaters is non-essential since stagnant waters lose their continued corrosivity and more particularly so when they are reduced in temperature.

Various embodiments of the invention may be employed within the scope of the following claims.

I claim:

1. A domestic water heater comprising an outer casing, a metal shell within the casing for storing the heated water, a ceramic enamel lining fused to the interior of the shell to protect the shell against corrosion, heat insulating material disposed in the space between said casing and shell to reduce the heat loss from the shell to the casing and provide a substantial temperature differential therebetween, an anode of non-corrodible metal disposed within the shell and exposed to the water therein, a thermopile surrounded by said heat insulating material and located between the shell and casing and having its hot and cold junctions disposed to be responsive to the temperatures, respectively, of the exterior of the shell and the casing, and means connecting positive and negative terminals of said thermopile, respectively, to said anode and said shell to cathodically protect the metal of the shell exposed by defects in the ceramic enamel from corrosion by the water.

2. In a domestic hot water storage heater and the like including a closed metal shell for receiving cold water and for storage of a minimum supply of heated water in the upper part thereof and subject to chemical corrosion by the water contained therein, means for heating the water received within said shell, a cooling member exteriorly of said shell and spaced therefrom, an electrode disposed within said shell and relatively less subject to chemical corrosion by the water contained therein, a thermo-battery disposed between said shell and said member near the top of the shell with the hot and cold junctions respectively subject to the respective temperatures of said supply of heated water and said member, conductors connecting the positive and negative terminals of said thermo-battery respectively with said electrode and said shell to complete an electric circuit with said electrode and said shell maintained respectively anodic and cathodic, a coating of ceramic enamel lining the inside of said shell to provide substantial protection of the shell against corrosion and serving to reduce the current output requirement of said thermo-battery, insulation means surrounding said thermo-battery and disposed between said shell and said member for retaining the heat of said shell and insulating said member therefrom, said cooling member being subject to and maintained at substantially surrounding atmospheric temperatures, control means responsive to the temperature of the water within said shell to maintain the temperature of the water and said shell uniformly higher than that of said cooling member insuring the continuous operation of said thermo-battery at the required voltage output for substantially complete cathodic protection of said shell against corrosion by the water contained therein without damage to said lining or contamination by said electrode with an excessive voltage output and without danger of the reverse polarity of said circuit or of contamination of the water by said shell with insufficient voltage output.

References Cited in the file of this patent

UNITED STATES PATENTS

| Number | Name | Date |
| --- | --- | --- |
| 88,285 | Farmer | Mar. 30, 1869 |
| 1,581,024 | Schnetzer | Apr. 13, 1926 |
| 2,267,361 | Andrus | Dec. 23, 1941 |
| 2,343,440 | Andrus | Mar. 7, 1944 |